W. WITTIG.
FASTENING MEANS FOR OPTICAL INSTRUMENTS
APPLICATION FILED FEB. 14, 1921.
1,385,512.
Patented July 26, 1921.
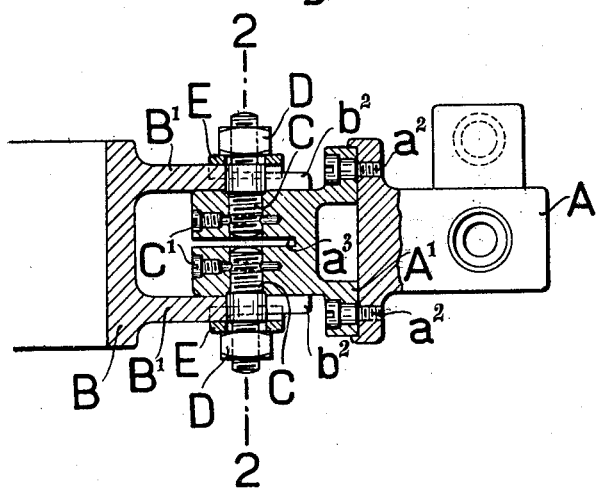
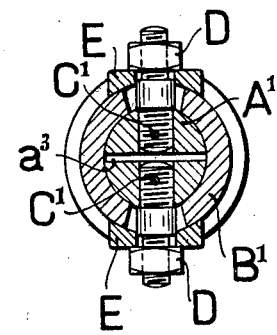
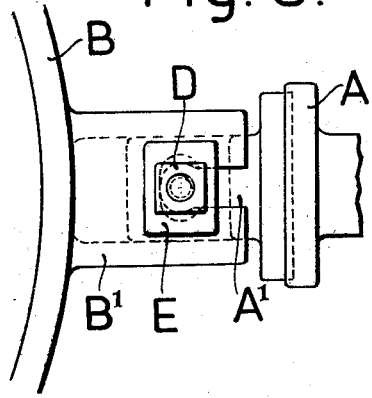
Inventor
Wilhelm Wittig
By Knight Bros
Attys

UNITED STATES PATENT OFFICE.

WILHELM WITTIG, OF AUGSBURG, GERMANY, ASSIGNOR TO FRIED. KRUPP AKTIEN-GESELLSCHAFT, OF ESSEN-ON-THE-RUHR, GERMANY.

FASTENING MEANS FOR OPTICAL INSTRUMENTS.

1,385,512.     Specification of Letters Patent.     Patented July 26, 1921.

Application filed February 14, 1921. Serial No. 444,899.

*To all whom it may concern:*

Be it known that I, WILHELM WITTIG, residing at Augsburg, Germany, a citizen of the German Republic, have invented a certain new and useful Improvement in Fastening Means for Optical Instruments, (for which I have filed application in Germany, Nov. 3, 1915,) of which the following is a specification.

This invention relates to a means for fastening an optical instrument, such as a telescope, speculum or the like, to its support, the chief feature of the present invention residing in the fact that the direction of the optical axis of the instrument, after said axis has been accurately adjusted relative to the support, suffers no alteration by the fastening operation itself with regard to said support.

In the drawing affixed to this specification and forming part thereof, a form of execution of the subject matter of this invention as applied to a telescope is illustrated by way of example. In the drawing—

Figure 1 is an axial section through the fastening means, with the telescope shown in elevation, Fig. 2 is a cross section on line 2—2 in Fig. 1, looking from the left, and Fig. 3 is a top view of Fig. 1, with the telescope broken away.

Referring to this drawing, the telescope A is provided with a cylindrical projection $A^1$ extending transversely to its optic axis and rigidly united to it by means of a plurality of screws $a^2$. By aid of this projection $A^1$, the telescope is adapted to be supported by a cylindrical sleeve $B^1$ which constitutes the bearing for said projection $A^1$. Within this latter, there is formed a diametrical slot $a^3$ dividing the projection $A^1$ for the major part of its length into two, slightly resilient halves. In addition, there are screwed into the projection $A^1$ two oppositely disposed screws C, secured against any subsequent accidental displacement by screw splines $C^1$. The portion of the screw C extending beyond the projection $A^1$ has a smooth circular cross section, for a length approximately equal to the thickness of the wall of the sleeve $B^1$, the adjoining free end of said screws being again threaded to accommodate the screw nuts D. Within the sleeve $B^1$ there are arranged two oppositely disposed slots $b^2$, extending in the direction of the longitudinal axis of the sleeve and adapted to just afford a passage for those parts of the screws C which extend beyond the projection $A^1$ these slots $b^2$ being somewhat enlarged toward both sides at their inner end (Figs. 2 and 3). The arrangement of these slots $b^2$ is so devised that after the projection $A^1$ fitted with the screws C secured by the splines $C^1$, has been inserted into the sleeve $B^1$, the screws C will project through the aforesaid enlarged portion of the slots $b^2$, so that the telescope A may be rocked for a comparatively small angle corresponding to the enlargement of the slots $b^2$, about the longitudinal axis of the projection $A^1$ for the purpose of accurately adjusting the optical axis of the telescope relatively to the sleeve $B^1$. The two nuts D serve for clamping the telescope, after its optical axis has been accurately adjusted. These nuts D, when tightened, press against the sleeve B, by intervention of washers E shaped to correspond to the circumference of said sleeve and exert at the same time, a traction upon the screws C which is directed radially outward and forces the two halves of the projection $A^1$ from within against the sleeve $B^1$. In this way the friction between the projection $A^1$ and the sleeve $B^1$ is increased to such an extent that said projection will be rigidly connected to the latter.

The chief advantage of the improved fastening means consists in the fact that by tightening the screw nuts D establishing the rigid connection between the parts, no forces whatsover are applied to the projection $A^1$ and therewith to the telescope A which might be liable to occasion any—if but ever so little—subsequent displacement of the optical axis of the telescope once it has been accurately adjusted.

Claims:

1. An arrangement of the class described comprising a projection, said projection being slotted, a slotted sleeve for receiving said projection and means for forcing the parts of the projection which are separated by the slot radially against the sleeve.

2. A supporting means for a telescope or the like, comprising a projection, said projection being provided with a slot, a slotted sleeve for receiving said projection and screw and nut means for forcing the parts of the projection which are separated by the slot, radially against the sleeve.

The aforegoing specification signed in Germany, this 18th day of December, 1920.

WILHELM WITTIG.

In presence of—
 KARL SPORER,
 ANTON SPREIPLER.